UNITED STATES PATENT OFFICE.

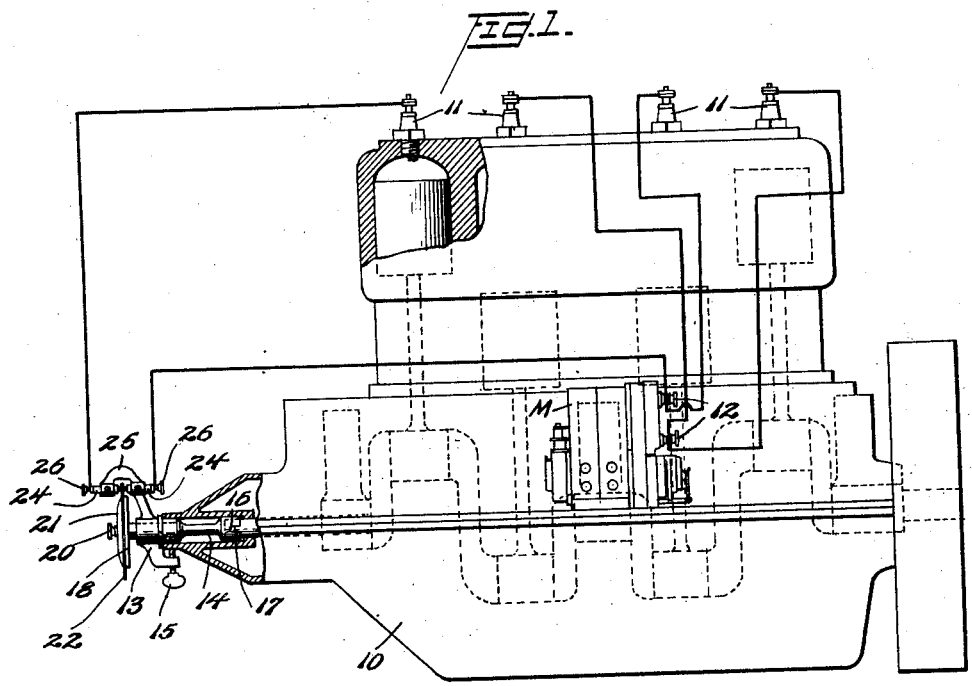
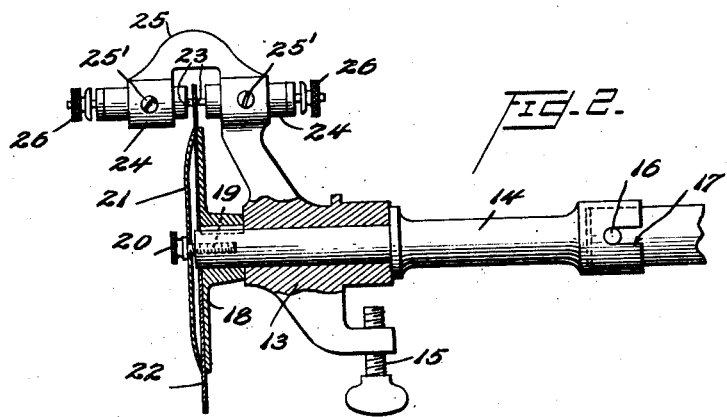
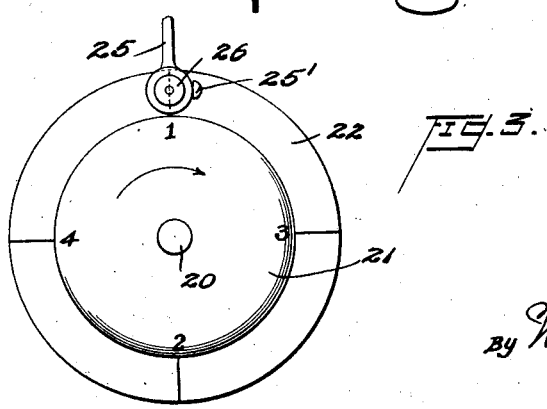

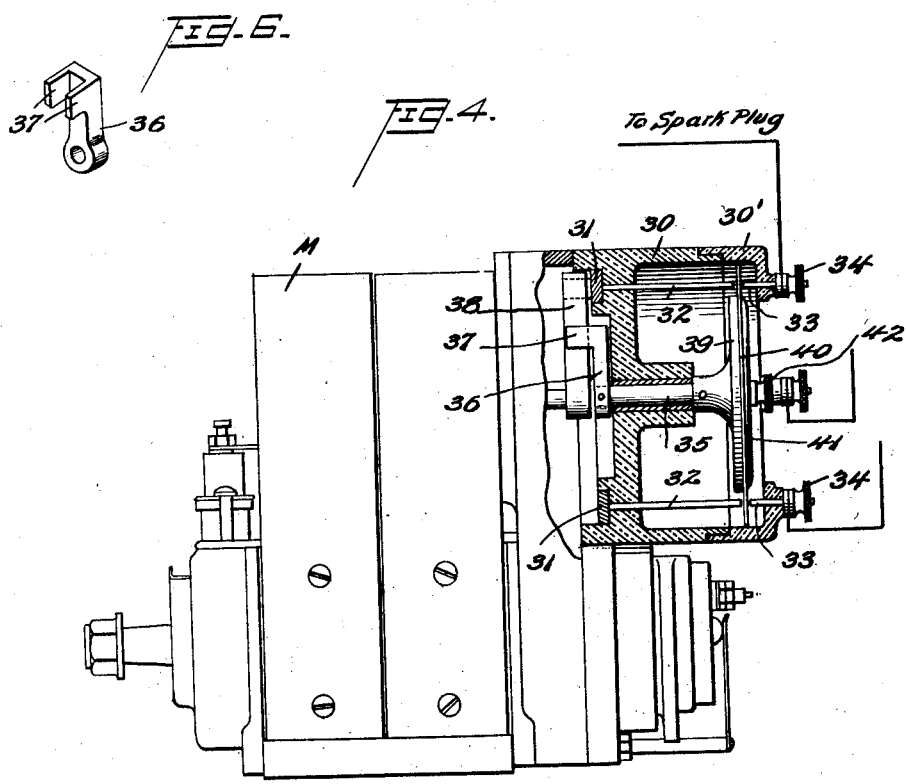
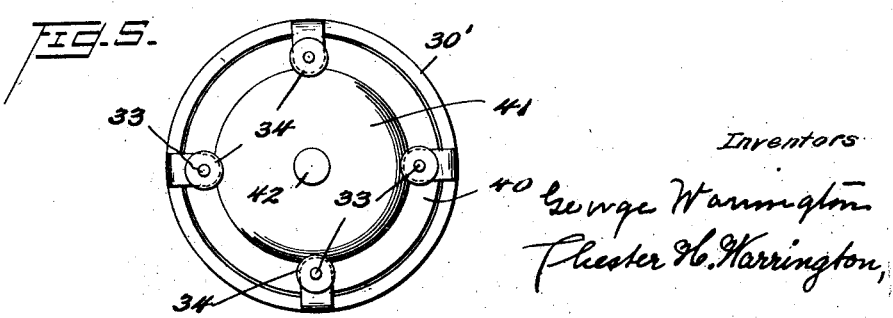

GEORGE WARRINGTON AND CHESTER H. WARRINGTON, OF WASHINGTON, DISTRICT OF COLUMBIA; SAID GEORGE WARRINGTON ASSIGNOR TO SAID CHESTER H. WARRINGTON.

TIMING DEVICE FOR HYDROCARBON ENGINES.

1,418,996.  Specification of Letters Patent.  Patented June 6, 1922.

Application filed October 11, 1920. Serial No. 415,962.

*To all whom it may concern:*

Be it known that we, GEORGE WARRINGTON and CHESTER H. WARRINGTON, citizens of the United States, and residing in the city of Washington, District of Columbia, have invented certain new and useful Improvements in Timing Devices for Hydrocarbon Engines, of which the following is a specification.

This invention relates to devices for timing the ignition of internal combustion engines, particularly automobile engines. Internal combustion engines are designed so that the spark which occurs at the spark plug to ignite the compressed charge of combustible gas in the engine cylinder occurs, for ordinary running speed, when the piston is at its highest point and the gas in its most highly compressed state. Various devices are employed to cause the spark to occur at this time and generally, in multi-cylinder engines, a distributor is used having a rotatable arm which successively completes the ignition circuit to the various cylinders as the pistons in these cylinders successively reach their upper limits of travel. In single cylinder engines other devices may be employed. Means is also provided for advancing and retarding the time of sparking, so that when the speed of the engine is high, the spark will occur at a short interval of time before the piston reaches its highest point and when the engine is running slowly, the spark may be retarded so that it occurs after the piston has reached its highest point and has begun to descend. Such distributors and spark advancing and retarding means are well known in the art, the latter means being rendered necessary to secure the maximum power from the engine at all speeds thereof in view of the fact that the combustible mixture requires an appreciable time to burn and to expand, as is well known.

It is essential that the timing of the ignition be accurate, that is, that the combustible mixture be ignited at the proper time to obtain the maximum force on the pistons, and in timing the engine it is necessary to adjust the distributor to synchronize the movements of the pistons and the movement of the distributor arm, it being apparent that if these two elements are not properly synchronized that the spark will occur and the combustible mixture be ignited when the piston is not in its correct position, thereby causing a loss of power and in some cases rendering the engine totally inoperative. Timing the ignition of such engines has been heretofore an operation difficult to accomplish, requiring considerable time because of the difficulty of determining the exact point at which the spark occurs relative to the piston travel.

It is the object of the present invention to provide a device for timing the ignition of an internal combustion engine by means of which such timing can be quickly effected, and a degree of accuracy obtained which has heretofore been possible to obtain only by the expenditure of considerable time in the operation, involving trial runs of the motor, &c. The invention contemplates a rotatable record sheet arranged to be driven in synchronism with the engine crank shaft, and an electrical device incorporated in an ignition circuit for making suitable marks on the record sheet when a spark occurs, so that an inspection of the sheet will disclose any discrepancy in the timing and the exact amount of such discrepancy so that the error may be corrected at once. The device is simple, accurate, and easy to attach to an internal combustion engine. It may be embodied in various forms, two of which are disclosed in the following description taken in connection with the accompanying drawings, in which—

Figure 1 is a side view of a four cylinder internal combustion engine one cylinder being partly broken away, showing the timing device attached thereto;

Figure 2 is an enlarged side view of the record disk holding device illustrated in Figure 1, part being broken away;

Figure 3 is an end view of the same;

Figure 4 is a side elevation of a well known type of magneto and distributor showing in section a modified form of timing apparatus attached thereto;

Figure 5 is an end view of the disk holding apparatus as viewed from the right, Figure 4;

Figure 6 is a perspective view of a detail.

The internal combustion engine illustrated in Figure 1 is of the type particularly adapted for use on automobiles, having four cylinders, a crank shaft and pistons, a suitable crank case indicated at 10, spark plugs indicated at 11, and a magneto with distributor attached, as indicated at M. The distributor has the usual arm which comes in contact successively with four fixed contacts, each of which is connected to a corresponding binding post 12, these binding posts being in turn connected respectively to the four spark plugs of the engine. When the distributor arm touches one of the contacts connected to a binding post 12, a circuit is completed between the poles of the magneto and through the spark plug so that a spark occurs in the corresponding cylinder. It is essential, as before stated, that the distributor be so adjusted that this contact be made and the spark occur when the piston is in its proper position, for ordinary running speeds when the piston is in its uppermost position.

As shown in Figures 1 and 2, a support 13 for a rotatable spindle 14 is adapted to be clamped by means of a thumb screw 15 to the forward end of the crank case in such position that the rear end of the spindle 14 extends within the opening designed to receive the crank lever for starting the engine, with the recessed rear portion of the spindle surrounding the forward end of the crank shaft and the pins 16 on the crank shaft lying within slots 17 in the spindle, thereby connecting the spindle and crank shaft for simultaneous rotation. To the forward end of the spindle is secured a record disk holding member 18 circular in form and keyed to the spindle for rotation therewith. A screw 19 having a thumb nut 20 has threaded engagement with a recess in the end of the spindle and serves to secure to the spindle a spring plate 21. A record disk 22 is clamped between plate 21 and disk 18, this disk being preferably of paper although other suitable material may be used.

The record disk 22 extends laterally from the periphery of the disk holder, this annular extended portion lying between two spaced conductors 23 mounted in insulating blocks 24. A bracket 25 integral with the support 13 slidably supports the blocks 24 and set screws 25' are provided to secure the blocks in position, so that the gap between the ends of the conductors may be varied in length as found necessary in practice. On the outer ends of the conductors 23 are binding screws 26 by means of which wires may be secured thereto. One of the conductors is electrically connected to a binding screw 12 on the distributor and the other is connected to the spark plug of the corresponding cylinder.

The paper disk 22 which will rotate at the speed of the crank shaft, has one or more radial lines or marks thereon, as shown in Figure 3, and the disk is so adjusted relatively to the support that the radial line selected will lie between the adjacent ends of the conductors 23 when the piston in the cylinder to be timed is at its highest point. The timing of any one cylinder may be tested but in the drawings we have illustrated the apparatus in position to test the timing of the number one cylinder, one of the conductors 23 being connected to the spark plug of the number one cylinder and the other being connected to that binding post 12 of the distributor which is normally connected to this spark plug.

The engine is then started or turned over manually and, as the record disk rotates the radial line thereon which has been selected will pass between the conductors 23 whenever the piston is passing its highest point. If the distributor is properly adjusted a spark will jump across the gap between the conductors 23 each time the piston is thus passing its highest point and the radial line is passing the spark gap, the spark being of sufficient intensity to puncture the disk. If, however, the distributor is not properly adjusted, the spark may occur either before or after the radial line has passed the spark gap, thereby indicating that the spark is wrongly timed, and also indicating the amount of the error. After a correction has been made to the distributor the paper disk may be rotated relatively to the holder until a new radial line lies between the conductor 23 when the number one piston is at its highest point. The engine is again operated and if the spark does not occur as this radial line passes the spark gap a further correction is required, but in practice this is seldom necessary.

Instead of placing the record disk at the front of the engine and connected directly to the crank shaft, it may be rotated by the distributor arm of the magneto and in Figures 4, 5 and 6 we illustrate a construction whereby the timing may be accomplished in this manner. In this modification a frame 30 is attached to the front of the distributor, the usual distributor plate thereof having been removed, this frame having a ring 30' removably secured thereto, which ring has four short arms extending radially inward. The ring 30' is adapted to be removed from the frame for the purpose of inserting and removing record disks. The frame 30 has four contacts 31 corresponding to the ordinary distributor contacts and each of these contacts has a conductor 32 electrically connected therewith and extending forwardly and terminating a short distance from the end of a similar conductor 33 mounted in the ring 30' and having a binding screw 34 secured to its outer end. Journaled in the center of the frame is a spindle 35 having at its rear end an arm 36 provided with fingers 37 which extend on opposite sides of the distributor arm 38 so that this arm and the spindle 35 are constrained to rotate together.

To the forward end of the spindle 35 is secured a disk 39 against which a paper record disk 40 may rest, being secured in position by a spring plate 41 fastened by a thumb screw 42. The record disk 40 is similar to the record disk described in connection with the apparatus illustrated in Figures 1, 2 and 3, being composed of paper or similar material which may be punctured by an electric spark, and having one or more radial lines thereon. This disk is so positioned on its support that the radial line selected lies between a pair of opposed conductors when the piston is at its highest point, exactly as described in connection with the first form of the invention previously disclosed. As the motor runs therefore a spark will jump between the conductors 32 and 33 when the distributor arm contacts with the corresponding contact 31 and will penetrate the paper. If the piston and distributor arm are properly synchronized the puncture will occur exactly on the line selected. If it is either advanced or retarded the puncture will occur to one side or the other of the line. Adjustment may be made as before until the puncture occurs exactly on the line.

It will be understood that the ignition may be timed in this manner by taking only one cylinder but if desired all four cylinders may be timed at once by connecting the four binding screws 34 to the frame of the engine, preferably to the spark plugs, which form convenient terminal points for the wires. In this case a record disk should be used having four radial lines thereon, one for each cylinder, these lines being at angles of 90° from each other. The radial lines will be numbered 1, 2, 3 and 4 and if the timing is perfect the disk will be punctured at each of these lines as the lines pass the respective spark gaps.

Obviously it is not necessary, where the frame of the engine constitutes a return to the magneto, to attach the wires to the spark plugs. The wires may be attached to the frame at any point, but the arrangement of circuits illustrated is convenient and satisfactory. The parts 30, 30' should have an indicator or other device for properly alining the conductors 32, 33.

Other forms of the invention may be designed for timing the engines of different constructions and it will be obvious to one skilled in the art that the invention is not limited to the two forms described and illustrated in this application.

What we claim as new and desire to secure by Letters Patent is:

1. Means for timing the ignition in a hydrocarbon engine comprising a record disk, a holder for the disk adapted to be driven from the crank shaft, and means incorporated in an ignition circuit for making a record on the disk.

2. In combination with a hydrocarbon engine having a crank shaft and an ignition distributor, means for timing the ignition comprising a holder for a record disk, means driven by the crank shaft for rotating the disk holder, and devices in circuit with the distributor for making a record on a disk supported in said holder.

3. Means for timing the ignition in a hydrocarbon engine comprising, a record disk, a rotatable holder for the disk adapted to be driven from the crank shaft, and means incorporated in a circuit between the poles of the ignition current source for making a record on the disk.

4. Means for timing the ignition in a hydrocarbon engine comprising, a record disk, a rotatable holder for the disk adapted to be driven from the crank shaft, and a circuit between the poles of the ignition current source, said circuit including a spark gap adjacent the record disk whereby a record is made thereon by sparks jumping said gap.

5. Means for timing the ignition in a hydrocarbon engine comprising, a record disk, a rotatable holder for the disk adapted to be driven from the crank shaft and a circuit between the poles of the ignition current source which has a spark gap therein the terminals of which lie on opposite sides of the record disk, whereby the latter may be marked by a spark jumping the gap.

6. Means for timing the ignition in a hydrocarbon engine having a distributor driven from the crank shaft comprising, a record disk, a rotatable holder for the disk adapted to be driven from the distributor, and means incorporated in a circuit between the poles of the ignition current source for making a record on the disk.

7. Means for timing the ignition in a hydrocarbon engine having a magneto and distributor driven from the crank shaft comprising, a record disk, a rotatable holder for the disk adapted to be driven from the distributor, and means incorporated in a circuit between the poles of the magneto and including the distributor, for making a record on the disk.

8. Means for timing the ignition in a hydrocarbon engine having a magento and distributor driven from the crank shaft comprising, a record disk, a rotatable holder for the disk adapted to be driven from the distributor, and a circuit between the poles of the magneto including the distributor and a spark gap adjacent the record disk, whereby a record is made thereon by a spark jumping the gap.

9. Means for timing the spark of an internal combustion engine, comprising, in combination, a rotatable member adapted to be driven in synchronism with the crank shaft, a source of electric current, an electrical circuit between the poles of said current source including a distributor for closing the circuit when the crank shaft is in a specified position, said circuit having a spark gap, and a blank record sheet mounted on said rotatable member and projecting between the terminals of the spark gap, the record sheet being adapted to be punctured by a spark whenever the circuit is closed by the distributing arm, for the purpose set forth.

10. Means for timing the ignition in a hydrocarbon engine comprising a recording sheet, a holder for the sheet adapted to be moved in synchronism with the crank shaft, and an electrical device for making a record on the sheet, said device being incorporated in an electrical circuit which becomes energized when an ignition spark occurs.

11. Means for timing the ignition in a hydrocarbon engine comprising a recording sheet, a holder for the sheet adapted to be moved in synchronism with the crank shaft, and a device for making a record on the sheet, said device being associated with the timing mechanism and adapted to make a mark on the sheet when an ignition spark occurs.

In testimony whereof we affix our signatures.

GEORGE WARRINGTON.
CHESTER H. WARRINGTON.